(12) United States Patent
Garreau et al.

(10) Patent No.: US 10,110,567 B2
(45) Date of Patent: Oct. 23, 2018

(54) SERVER USING UNPREDICTABLE SCRAMBLED COOKIE NAMES

(71) Applicant: GEMALTO SA, Meudon (FR)

(72) Inventors: Eric Garreau, La Ciotat (FR); Alexandre Schaff, La Ciotat (FR)

(73) Assignee: GEMALTO SA, Meudon (FR)

( * ) Notice: Subject to any disclaimer, the term of this patent is extended or adjusted under 35 U.S.C. 154(b) by 90 days.

(21) Appl. No.: 14/917,856

(22) PCT Filed: Jul. 11, 2014

(86) PCT No.: PCT/EP2014/064981
§ 371 (c)(1),
(2) Date: Mar. 9, 2016

(87) PCT Pub. No.: WO2015/036145
PCT Pub. Date: Mar. 19, 2015

(65) Prior Publication Data
US 2016/0226832 A1    Aug. 4, 2016

(30) Foreign Application Priority Data

Sep. 13, 2013   (EP) ..................... 13306256

(51) Int. Cl.
*H04L 29/06*   (2006.01)
*G06F 21/62*   (2013.01)
(Continued)

(52) U.S. Cl.
CPC .......... *H04L 63/0428* (2013.01); *G06F 21/33* (2013.01); *G06F 21/6263* (2013.01); *H04L 63/04* (2013.01); *H04L 63/168* (2013.01); *H04L 67/02* (2013.01); *H04L 67/142* (2013.01); *H04L 67/146* (2013.01)

(58) Field of Classification Search
CPC ........................... G06F 21/6263; H04L 67/143
See application file for complete search history.

(56) References Cited

U.S. PATENT DOCUMENTS 8,856,869 B1 * 10/2014 Brinskelle ............... H04L 63/08
726/12
2002/0099936 A1   7/2002 Kou et al.
(Continued)

FOREIGN PATENT DOCUMENTS

EP       2 363 995 A1    9/2011

OTHER PUBLICATIONS

Lin et al., "Direct Web Switch Routing with State Migration, TCP Masquerade, and Cookie Name Rewriting", pp. 3663-3667 (Year: 2003).*

(Continued)

*Primary Examiner* — Thaddeus J Plecha
(74) *Attorney, Agent, or Firm* — Buchanan Ingersoll & Rooney PC

(57) ABSTRACT

The present invention relates to a server comprising at least an application outputting at least one cookie, the server including a scrambled cookie names generator, a correspondence mechanism associating connections attributes for the application with an unpredictable scrambled cookie name, the scrambled cookie name being the one provided in the cookie sent to client side for use in the next connections to the application.

1 Claim, 1 Drawing Sheet

(51) Int. Cl.
 *H04L 29/08* (2006.01)
 *G06F 21/33* (2013.01)

(56) References Cited

U.S. PATENT DOCUMENTS

| | | |
|---|---|---|
| 2004/0044768 A1 | 3/2004 | Takahashi |
| 2007/0245137 A1* | 10/2007 | Bhagat ............... H04L 63/0471 713/153 |
| 2011/0219057 A1 | 9/2011 | Scoda |
| 2012/0005738 A1 | 1/2012 | Manini et al. |

OTHER PUBLICATIONS

International Search Report (PCT/ISA/210) dated Aug. 13, 2014, by the European Patent Office as the International Searching Authority for International Application No. PCT/EP2014/064981.
Written Opinion (PCT/ISA/237) dated Aug. 13, 2014, by the European Patent Office as the International Searching Authority for International Application No. PCT/EP2014/064981.
Park, J.S. et al., "Secure Cookies on the Web 11", IEEE Internet Computing, pp. 36-44, Jul. 1, 2000. (XP002190888).

* cited by examiner

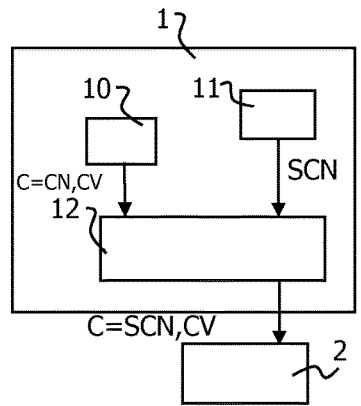
FIG.1
| CN1 | SCN1 |
| CN2 | SCN2 |
| CN3 | SCN3 |
| CN4 | SCN4 |
FIG.2
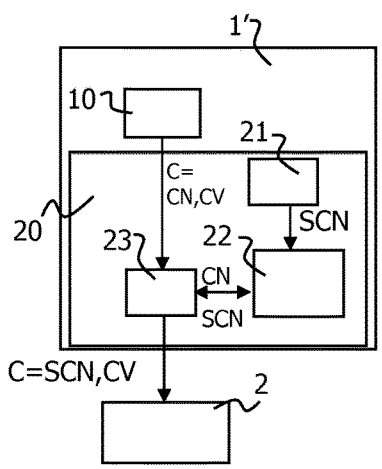
FIG.3
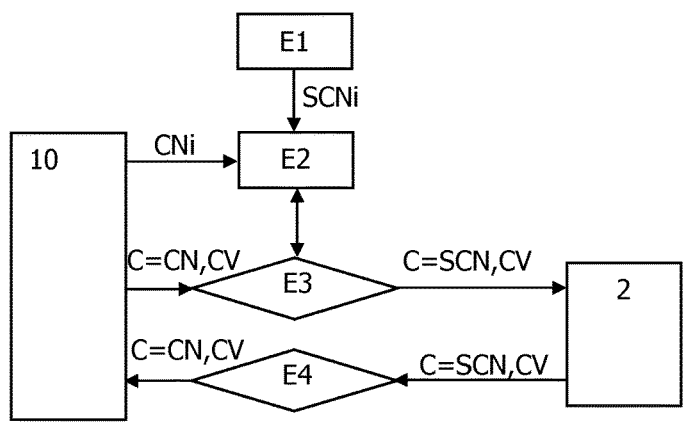
FIG.4

SERVER USING UNPREDICTABLE SCRAMBLED COOKIE NAMES

FIELD OF THE INVENTION

The present invention relates to a server manipulating cookie. Web server are thus particularly concerned by the invention but any server using such small packet of data a program receives and sends again unchanged is also concerned.

The invention also concerns a method of processing cookies in a server of the invention.

BACKGROUND OF THE INVENTION

A cookie, for instance an HTTP cookie, web cookie, or browser cookie, is a small piece of data sent from a website and stored in a user's web browser while the user is browsing that website. Cookie classically consists of six components: name of the cookie, value of the cookie, expiry of the cookie (using Greenwich Mean Time), path the cookie is good for, domain the cookie is good for, need for a secure connection to use the cookie but only the first two components (name and value) are required for the successful operation of the cookie.

Every time the user loads the website, the browser sends the cookie back to the server to notify the website of the user's previous activity. Cookies also enable websites to remember information. Authentication cookies are the most common method used by web servers to know whether the user is logged in or not, and which account they are logged in under. Without such a mechanism, the site would not know whether to send a page containing sensitive information, or require the user to authenticate themselves by logging in. The security of an authentication cookie generally depends on the security of the issuing website and the user's web browser, and on whether the cookie data is encrypted.

Security vulnerabilities may allow a cookie's data to be read by a hacker, used to gain access to user data, or used to gain access (with the user's credentials) to the website to which the cookie belongs (cross-site scripting and cross-site request forgery).

Most websites use cookies as the only identifiers for user sessions, because other methods of identifying web users have limitations and vulnerabilities. If a website uses cookies as session identifiers, attackers can impersonate users' requests by stealing a full set of victims' cookies. From the web server's point of view, a request from an attacker then has the same authentication as the victim's requests; thus the request is performed on behalf of the victim's session.

The field of this invention is typically related to HTTP client security, solving vulnerability at the browser level. More widely, the invention can be applied to any network using cookies defined by a name and a value sent by a server and stored by a client. Classical protection methods against cookie stealing are not efficient against cookie-stealing or cookie-tossing attacks. Service can also be denied for a user by overriding the current cookie with a bad/fake one.

Although a lot of protections are supposed to prevent an evil usage of a stolen cookie, it is still possible to lure the server with a cookie which will be accepted due to the fact that cookie names are public, thus predictable.

Further alternative and advantageous solutions would, accordingly, be desirable in the art.

SUMMARY OF THE INVENTION

The present invention aims at preventing cookie stealing or at least at rendering such cookie stealing useless. Above-mentioned malicious attacks are made more difficult.

To this purpose, the invention proposes a server comprising at least an application outputting at least one cookie, said server being characterized in that it further comprises a scrambled cookie names generator, a correspondence mechanism associating connections attributes for an application with an unpredictable scrambled cookie name, said scrambled cookie name being the one provided in the cookie to client side for use in the next connections to the application.

This invention allows to add an extra client protection by implementing a new logic on the server side. In the meaning of the invention, the term "server" designates the server side's execution environment in a general acceptation. The invention solves the weakness by turning the problem upside-down. The cookie name becomes a random key, associated with the usual highly protected value of the cookie itself. The originality of the invention is to modify the cookie content while using a protection principle close to an anti-CSRF protection. As the name of the cookie is not predictable and recognizable, attacks on website are rendered difficult or randomized.

According to a specific implementation, said application outputs a cookie having an application defined cookie name, said correspondence mechanism further storing the application defined cookie name associated with connections attributes for the application.

This implementation avoids any modification in the application while remaining transparent for the operation of the application.

Advantageously, said server is a Web server or an application server.

Such servers extensively make use of cookies and take the best advantage from the invention.

In an advantageous application, said cookies are http cookies.

These cookies are massively used and they are commonly subject to attack.

According to a particular embodiment, said server uses a library providing the scrambled cookie names generator for the application to generate its unpredictable scrambled cookie names inputted in the correspondence mechanism, said library also serving to check the scrambled cookie name when back from the client side, according to the correspondence mechanism.

This embodiment is such that the invention is directly managed by the server side software. It requires a modification in the server itself concerning the connections and the processing of connection messages.

Advantageously, the so called library is an external piece of software developed according to the server API and, allowing dynamic loading support and direct usage of the library from the code embedded in the server.

The library is used by the application in order to generate/check its session cookies. This implementation is equivalent to the previous one but presents advantages in terms of integration. In both previous cases, the server itself manages the invention.

According to another particular embodiment, said server uses a front-end reverse proxy comprising the correspondence mechanism, the scrambled cookie names generator and an interceptor dedicated to intercept application defined cookie names in connection messages from said application, to insert scrambled cookie name instead and to repeat the connection message towards the client side with the scrambled cookie name, said interceptor being also dedicated to intercept scrambled cookie name in connection messages from the client side, to insert the application defined cookie name instead and to repeat the connection message towards the application with the clear cookie name.

With this embodiment, the invention is transparently managed by a reverse proxy on the server side. The front-end reverse proxy interceptor is able to add this protection without any modification made to the backend side, by assuming the scrambled to clear cookie name translation. This embodiment enables to implement the invention only by modifying the configuration of the reverse proxy. It is here noted that there exist cases where cookie names should not be modified (predefined cookie expected by corresponding application on the client side). In this case, the configuration of the reverse proxy is adapted to the protected application in order for the scrambling not to be applied.

According to another embodiment, said server uses a front-end reverse proxy comprising the correspondence mechanism and an interceptor, said reverse proxy using an external module comprising a library providing the scrambled cookie names generator for the application to generate its unpredictable scrambled cookies inputted in the correspondence mechanism, said library also serving to check the scrambled cookie when back from the client side, according to the correspondence mechanism.

This embodiment uses an external library that could be linked to the application to generate the scrambled cookie names. This implementation is equivalent to the previous one but presents advantages in terms of integration. Advantageously, the so called module is an external piece of software developed according to the reverse proxy API and allowing dynamic loading support and direct usage of the library from the code embedded in the reverse proxy.

This feature corresponds to an easy deployment of the solution of the invention through a simple configuration.

The present invention also relates to a method to manage cookie names on a server side having at least an application outputting at least one cookie, said method comprising a step of generating an unpredictable scrambled cookie name, a step of storing said scrambled cookie name in association with connections attributes for the application in a correspondence mechanism and a step of provisioning the scrambled cookie name in the cookie sent to the client side for use in the next connections to the application.

Such a method enables to modify the name of a cookie as used by an application to a random name that cannot be predicted by attackers. It is here noted that connections attributes can include client (browser for example) fingerprinting attributes.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIG. 1 schematically represents a server of the invention according to the embodiments where the invention is directly managed by the server;

FIG. 2 shows an example of a correspondence mechanism of the invention;

FIG. 3 schematically represents a server of the invention according to the embodiments where the invention is implemented using a reverse proxy;

FIG. 4 shows a flowchart of a method of the invention.

DETAILED DESCRIPTION OF EMBODIMENTS OF THE INVENTION

The same elements have been designated with the same reference numerals in the different drawings. For clarity, only those elements and steps which are useful to the understanding of the present invention have been shown in the drawings and will be described. Moreover, when an action is said to be performed by a device, it is in fact executed by a microprocessor in this device controlled by instruction codes recorded in a program memory on the said device.

FIG. 1 schematically shows a server 1 of the invention according to a first embodiment. This server 1 implements at least an application 10. This application 10 uses cookies C. Such cookie C is packet of data a program receives on a client device 2 when the client communicates with the application 10. Typically the user navigates and uses the application 10. The cookie C is then sent back again unchanged to the server 1 on later connections. For correct operation, the cookie comprises at least a name CN of the cookie and a value CV of the cookie. The name CN depends at least from the application 10 and is predictable. As seen above, the name of the cookie can be stolen or generated and used for malicious purposes.

The server 1 of the invention comprises a scrambled cookie name generator 11 and a correspondence mechanism 12. Here the cookie name generator 11 is advantageously a library providing scrambled cookie names SCN to the correspondence mechanism 12.

FIG. 2 show a very simple implementation of a correspondence mechanism 12 of the invention. It consists in a correspondence table listing the names CNi of cookies as used by the application 10 associated with a scrambled name SCNi as generated by the scrambled cookie name generator 11. The correspondence mechanism 12 is thus advantageously dedicated to construct and manage a table by assuming the scrambled (or random) to original (or clear) cookie translation. For example this table is a cross-hashtable.

As shown on FIG. 1, the scrambled name SCN is the one that is sent with the cookie value CV towards the client device 2. Here the server itself is configured to output itself the cookie C=(SCN,CV). In the opposite way, when a command is received from the client device 2, the server 1 is configured to make use of the correspondence mechanism 12 in order to retrieve the original cookie name CN instead of the scrambled one SCN.

FIG. 3 shows another embodiment of a server 1' of the invention wherein a front-end reverse proxy 20 is implemented. Here the server 1' is advantageously a server side's execution environment typically comprising several server machines. In a classical implementation, the reverse proxy 20 is implemented on a given server machine while the application 10 is implemented on another server machine. This reverse proxy 20 receives commands or data from an application 10. In order to implement the invention, the reverse proxy 20 comprises a dedicated interceptor 23. Said interceptor 23 intercepts commands and exchanges to be sent to the client device 2 and originating from said application 10.

Commands interesting the invention are the ones comprising at least a cookie C=(CN,CV) having at least a name CN and a value CV.

Once the cookie is intercepted it is submitted to a correspondence mechanism 22. This correspondence mechanism 22 is in relation with a scrambled cookie name generator 21 that provides scrambled cookie names SCN. The scrambled cookie name generator 21 can also be implemented through the use of a library stored in a module external to the reverse proxy (not illustrated). When the correspondence mechanism receives a cookie name CN in a command from the interceptor 23, it replaces this cookie name CN by the corresponding scrambled cookie name SCN.

Thus the interceptor 23 has advantageously an intermediate message processor intercepting cookie name CN in messages originating from the application 10, replacing the cookie name CN by the scrambled one SCN corresponding to the connections attributes of this application 10 in the correspondence table 12 and repeating the intercepted message with the scrambled cookie name SCN thus provided to the client side 2.

Then when commands from the client device 2 are received by the server side 1', they are intercepted by the interceptor 23 in the reverse proxy 20. The scrambled cookie name SCN is submitted to the correspondence mechanism 22 which returns the cookie name CN as used by the application 10 itself. Said intermediate message processor thus further intercepts messages originating from the client device 2 and replace the scrambled cookie name SCN in the message by the original clear one CN. At last, the command is sent to the application 10 with the cookie C having its original name CN.

FIG. 4 is a flowchart of the method of the invention. In a first step E1, scrambled cookie names SCNi are generated. It has to be noted here that, in practice, this scrambled name generation E1 can be done previously to any cookie manipulation or can be done on demand when a cookie name CN is present in a command coming from an application 10. In a step E2, scrambled cookie names SCNi are stored in a correspondence mechanism in association with cookie names CNi.

When the application 10 then emits a command with a cookie having a cookie name CN and a cookie value CV, a scrambled cookie names SCN is provisioned in a step E3 to the client device 2.

On the other way, in the next connections to the application 10, when the client device 2 sends a command towards the application 10 with the corresponding cookie C=SCN, CV having a scrambled cookie name SCN, a step E4 provisions the original cookie name CN that is introduced in the cookie as provided to the application 10.

By using scrambled cookie names, the invention avoids any prediction of the cookie names as it is currently the case. It also avoids easy link between a website and a cookie name. The table of the invention associates connection attributes with the random cookie name, allowing to ensure the attacker cannot either replay or forge a cookie. With the invention, cookie names in the browser and in the HTTP packets are modified. Unpredictable cookie names enforce security on the client side. The invention offers the possibility to add an extra protection without modifying the backend applications. It can thus be applied to existing solutions.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. Typically a library can be implemented within a proxy or an interceptor can be implemented directly in the server independently of the presence of a reverse proxy.

Thus, it is to be understood that the location or arrangement of individual elements within each disclosed embodiment may be modified without departing from the spirit and scope of the invention. In particular, the term "server" refers to the execution environment on server side, generally including several machines. The above detailed description is, therefore, not to be taken in a limiting sense, and the scope of the present invention is defined only by the appended claims, appropriately interpreted, along with the full range of equivalents to which the claims are entitled.

The invention claimed is:

1. A hardware web application server comprising at least an application outputting at least one http cookie having an application defined cookie name, said server further comprising a front-end reverse proxy comprising a correspondence mechanism associating connections attributes for the application with unpredictable scrambled cookie names and storing the application defined cookie name associated with the connections attributes for the application and an interceptor dedicated to intercept application defined cookie names in any connection messages from said application in the server, to insert a scrambled cookie name instead of an application defined cookie name in a connection message from the application and to send the connection message modified with the scrambled cookie name towards a client side, said scrambled cookie name being a cookie name provided in the at least one cookie sent to the client side for use in next connections to the application, said interceptor being also dedicated to intercept a scrambled cookie name in any connection messages received from the client side, to insert a corresponding application defined cookie name instead of a scrambled cookie name in a connection message and to send the connection message modified with the application defined cookie name towards the application using the connections attributes for the application as stored in the correspondence mechanism, said reverse proxy using an external module comprising a library providing a scrambled cookie names generator for the application to generate unpredictable scrambled cookie names inputted in the correspondence mechanism, said library also serving to check scrambled cookie names when returned from the client side, according to the correspondence mechanism, the external module being an external piece of software developed according to a reverse proxy Application Programming Interface and allowing dynamic loading support and direct usage of the library from any code embedded in the reverse proxy.

* * * * *